(12) United States Patent
Cabrera et al.

(10) Patent No.: US 12,523,445 B2
(45) Date of Patent: Jan. 13, 2026

(54) REFLECTIVE SIGHT FOR A FIREARM

(71) Applicant: Centre Firearms Co., Inc., Ridgewood, NY (US)

(72) Inventors: Juan D. Cabrera, Ridgewood, NY (US); Andrew Lees, Wake Forest, NC (US); Richard Ryder Washburn, III, Ridgewood, NY (US); Richard Ryder Washburn, II, Ridgewood, NY (US)

(73) Assignee: Centre Firearms Co., Inc., Ridgewood, NY (US)

( * ) Notice: Subject to any disclaimer, the term of this patent is extended or adjusted under 35 U.S.C. 154(b) by 0 days.

(21) Appl. No.: 18/912,117

(22) Filed: Oct. 10, 2024

(65) Prior Publication Data

US 2025/0035405 A1    Jan. 30, 2025

Related U.S. Application Data

(63) Continuation of application No. 18/388,060, filed on Nov. 8, 2023, now Pat. No. 12,117,265, which is a continuation of application No. 17/813,275, filed on Jul. 18, 2022, now Pat. No. 11,841,209, which is a continuation of application No. 17/159,328, filed on Jan. 27, 2021, now Pat. No. 11,391,540, which is a continuation of application No. 16/590,491, filed on Oct. 2, 2019, now Pat. No. 10,928,161.

(60) Provisional application No. 62/739,950, filed on Oct. 2, 2018.

(51) Int. Cl.
*F41G 1/01* (2006.01)
*F41G 1/02* (2006.01)
*F41G 1/34* (2006.01)
*F41G 1/10* (2006.01)

(52) U.S. Cl.
CPC ................. *F41G 1/01* (2013.01); *F41G 1/02* (2013.01); *F41G 1/345* (2013.01); *F41G 1/10* (2013.01)

(58) Field of Classification Search
CPC ... F41G 1/02; F41G 1/345; F41G 1/10; F41G 1/06; F41G 1/30; F41G 1/32
See application file for complete search history.

(56) References Cited

U.S. PATENT DOCUMENTS

| | | | |
|---|---|---|---|
| 3,192,632 A * | 7/1965 | Von Stavenhagen | F41G 1/10 42/144 |
| 3,346,962 A | 10/1967 | Luebkeman | |
| 3,500,545 A | 3/1970 | Chivers | |
| 4,017,995 A | 4/1977 | Hughes, Jr. | |
| 5,068,969 A | 12/1991 | Siebert | |
| 6,604,315 B1 | 8/2003 | Smith et al. | |
| 7,526,890 B1 | 5/2009 | Keng et al. | |

(Continued)

OTHER PUBLICATIONS

Cabrera, et al., "Reflective Sight for a Firearm,"; U.S. Appl. No. 17/813,275, filed Jul. 18, 2022.

*Primary Examiner* — Joshua E Freeman
(74) *Attorney, Agent, or Firm* — Duane Morris LLP

(57) ABSTRACT

A gun sight includes a rear sight including a plurality of light sources with each of at least two light sources of the plurality of light sources emitting a different color of light than the other of the at least two light sources; and a front sight including a reflective surface that is directly opposing the plurality of light sources, wherein the rear sight and the front sight are configured such that light emitted from the plurality of light sources is reflected by the reflective surface toward the rear sight.

13 Claims, 10 Drawing Sheets

(56) References Cited

U.S. PATENT DOCUMENTS

| | | |
|---|---|---|
| 7,631,433 B2 | 12/2009 | Labowski |
| 9,587,910 B1 | 3/2017 | Jackson |
| 9,658,030 B1 | 5/2017 | Heacock |
| 9,869,525 B1 | 1/2018 | Howe et al. |
| 9,909,838 B1 | 3/2018 | Jackson |
| 10,969,197 B2 | 4/2021 | Theisinger et al. |
| 2007/0107292 A1 | 5/2007 | Bar-Yona et al. |
| 2008/0092424 A1 | 4/2008 | Keng |
| 2012/0151817 A1 | 6/2012 | Howe et al. |
| 2014/0109460 A1 | 4/2014 | Howe et al. |
| 2014/0338246 A1 | 11/2014 | Crum |
| 2017/0016697 A1 | 1/2017 | Jones |
| 2017/0146318 A1 | 5/2017 | Plummer |
| 2018/0087871 A1 | 3/2018 | Toner |
| 2018/0172399 A1 | 6/2018 | Ben Zion et al. |
| 2019/0107368 A1 | 4/2019 | Ben Zion et al. |

\* cited by examiner

REFLECTIVE SIGHT FOR A FIREARM

CROSS REFERENCE TO RELATED APPLICATIONS

This application claims the benefit of U.S. Patent Application Ser. No. 62/739,950, filed Oct. 2, 2018; Ser. No. 16/590,491, filed Oct. 2, 2019, now U.S. Pat. No. 10,928,161 issued Feb. 23, 2021; Ser. No. 17/159,328, filed Jan. 27, 2021, now U.S. Pat. No. 11,391,540 issued Jul. 19, 2022; Ser. No. 17/813,275, filed Jul. 18, 2022, now U.S. Pat. No. 11,841,209 issued Dec. 12, 2023; and Ser. No. 18/388,060, filed Nov. 8, 2023, the entire contents of each of which are incorporated by reference for all purposes as if fully set forth herein.

BACKGROUND

Field of the Disclosure

The present disclosure relates to reflective sights that are used with a firearm.

Discussion of the Related Art

Sighting systems can be mounted on small arms to assist the user in aiming and firing a projectile towards a target. Small arms may include a machine gun, rifle, shotgun, handgun, pistol, paint-ball gun, air gun, bow, cross-bow, and the like. The term firearm is used throughout this disclosure to denote any gun or small arm, including but not limited to those just described, that can benefit from the inclusion of the disclosed sight system used to increase shooting accuracy.

Known mechanical or iron sights typically include two components mounted and fixed at different locations on the firearm which are visually aligned with the line of sight of the user and the target. In iron sights, a rear sight is mounted on a rear portion of the firearm closest to the user, and a front sight is mounted on a front portion of the firearm closest to the target. Some mechanical sights can be large, cumbersome to use, and include many moving parts. Thus, these mechanical sighting systems can become misaligned from rough handling, impact, use, wear in the various components, or environmental effects. At longer distances, precise aiming at a target down range can take time.

To overcome problems with mechanical sights, optical sights or scopes have been employed. Optical sights typically use optics to superimpose a pattern, reticle, or aiming point to assist in targeting. Many optical sights using reticles are telescopic for improved viewing and aiming precision at longer ranges. Typically, the time to acquire a target can be reduced using an optical sight, and accuracy can be improved.

In other optical sights, a laser pointer or external light-dot sight typically uses a laser diode to emit a beam parallel to the barrel of the firearm and illuminate a spot on the target. An external dot sight uses a laser pointer to project a laser beam directly onto the target leaving the illuminated "dot" on the target for acquisition. In this sight system, the illuminated dot can easily be seen is some conditions. However, if the ambient light intensity is high, the user may have a hard time seeing or be unable to locate or identify the dot on the target as the ambient light may wash out the target dot. Increasing the intensity of the light source providing the dot in an attempt to overcome this washing out more quickly decreases the useful life of the battery used to power the light source. In addition, if the target is farther away or not reflective, not enough light may be reflected for the user to identify the dot.

Internal reflective sights were developed to overcome these problems. A reflective sight type is generally non-magnifying and allows the user to look through a glass element at the target and see a reflection of an illuminated aiming point superimposed on the target within the field of view. An internal reflective sight only uses a dot within the sight system where the dot is not projected onto the target, but only reflected back to the user. At the target, the internal dot is not visible and is not affected by ambient light. This allows for more covert use as those down range do not know if a target is being acquired, and the projected dot does not give away a user's direction or location.

However, optical sights protrude from the top of the firearm, e.g., the slide of a semiautomatic handgun or a rail of a longer firearm. The increase in the firearm's profile causes the firearm to become more cumbersome and allows the optical sight to be more easily damaged.

For example, the sight adds weight to the firearm. The location of the center of gravity of the related art sight can change the firearm mechanics. Specifically, the related art sight can change the slide action and recoil of a handgun, thus increasing the possibility of jamming, premature wear, or other malfunction.

The bulky protrusion of the related art sights outside the original outline profile of the gun makes the handgun on which it is mounted harder to holster. An original holster may need modification or a new specially designed holster may be required to adequately accommodate the related art sight. Further, the related art sight may cause difficulty in drawing the handgun from the holster as it will be easier to catch the sight on an article of clothing, body armor, or other piece of gear.

The bulky protrusion of the related art sights also cause a firearm in which they are mounted to be less covert. The related art sights cause an irregular point outside of the firearm profile that sticks out and is more obvious as a threat. This would be undesirable in a concealed carry situation when the protrusion causes an unnatural and peculiarly shaped bulge in the user's clothing that would be more noticeable.

The protrusion of the sight may also cause discomfort by digging into the body during certain body movements of someone wearing a handgun in either an open holstered or concealed carry situation.

Also, reflective sights have replaced conventional mechanical sights used with a handgun. If the light source battery dies or the light system fails, the sight is rendered useless, and there is no backup sighting system on the handgun.

SUMMARY

In view of the problems described above, preferred embodiments of the present invention provide reflective iron sights for a firearm and provide rugged reflective iron sights that are less susceptible to damage from shock, impact, or external physical contact than that of the related art reflective sights.

Another advantage of an embodiment of the present invention is to provide a reflective sight that is a hybrid with a conventional iron sight that can be used as a reflective sight and/or a mechanical sight.

Another advantage of an embodiment of the present invention is to provide a reflective sight that reduces time to target alignment and improves accuracy over a conventional iron sight.

Another advantage of an embodiment of the present invention is to provide a reflective sight that is low profile so that it is less susceptible to damage when stored and easier to conceal and harder to detect than conventional reflective sights.

Another advantage of an embodiment of the present invention is to provide a reflective sight that stays within the dynamics of a semiautomatic firearm and does not adversely affect movement of the slide, recoil, round feeding, or case ejection.

Another advantage of an embodiment of the present invention is to provide a reflective sight that can be used in situations where it is undesirable to use the reflective sight features.

Another advantage of an embodiment of the present invention is to provide a reflective sight that is modular and serviceable in the field rather than at a gunsmith, depot, or armory.

Another advantage of an embodiment of the present invention is to provide a reflective sight capable of optical enhancement where the light source is easily filtered, made secure by reducing its infrared signature, or made night-vision compatible.

In an embodiment, a gun sight includes a rear sight including a plurality of light sources with each of at least two light sources of the plurality of light sources emitting a different color of light than the other of the at least two light sources; and a front sight including a reflective surface that is directly opposing the plurality of light sources, wherein the rear sight and the front sight are configured such that light emitted from the plurality of light sources is reflected by the reflective surface toward the rear sight.

In an aspect, the plurality of light sources is three light sources.

In an aspect, two of the plurality of light sources emit a same color of light.

In an aspect, the three light sources each emit a different color of light from each other.

In an aspect, the rear sight further includes an alignment feature such that light emitted from the plurality of light sources is reflected by the reflective surface through the alignment feature to indicate targeting alignment.

In an aspect, the alignment feature is a notch.

In an aspect, the reflective surface is recessed within an aperture of a front sight housing.

In an aspect, the front sight further includes an adjuster to adjust the reflective surface.

In an aspect, the front sight further includes a peep aperture to allow light to pass through the entire front sight.

In an aspect, the rear sight further includes a housing, an optic, and a power source to power the plurality of light sources.

In an aspect, the front sight further includes a housing, a reflective surface adjuster inside the housing, and a mount.

In an aspect, the reflective surface is included in an optic that allows light to pass through.

In an aspect, a firearm includes the gun sight.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is to be understood that both the foregoing general description and the following detailed description are exemplary. The descriptions herein are not intended to limit the scope of the present invention.

Reflective sights, in accordance with exemplary preferred embodiments of the present invention as disclosed herein, are mountable to a firearm and capable of being activated as a reflective sight or used as an iron sight. When an integrated light source is turned off, a user can align the rear sight and the front sight to the target without a reflected dot. When the integrated light source is turned on, a reflected dot assists the user in aligning the front sight to the rear sight.

Figure 1:
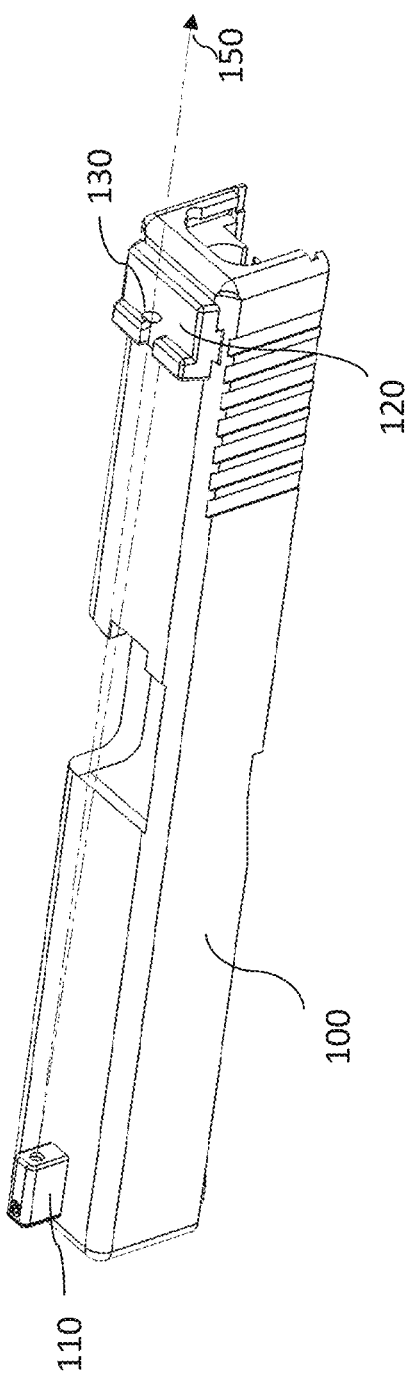
FIGS. 1 and 2 are perspective views of a reflective iron sight in accordance with an exemplary embodiment of the present invention.
Figure 2:
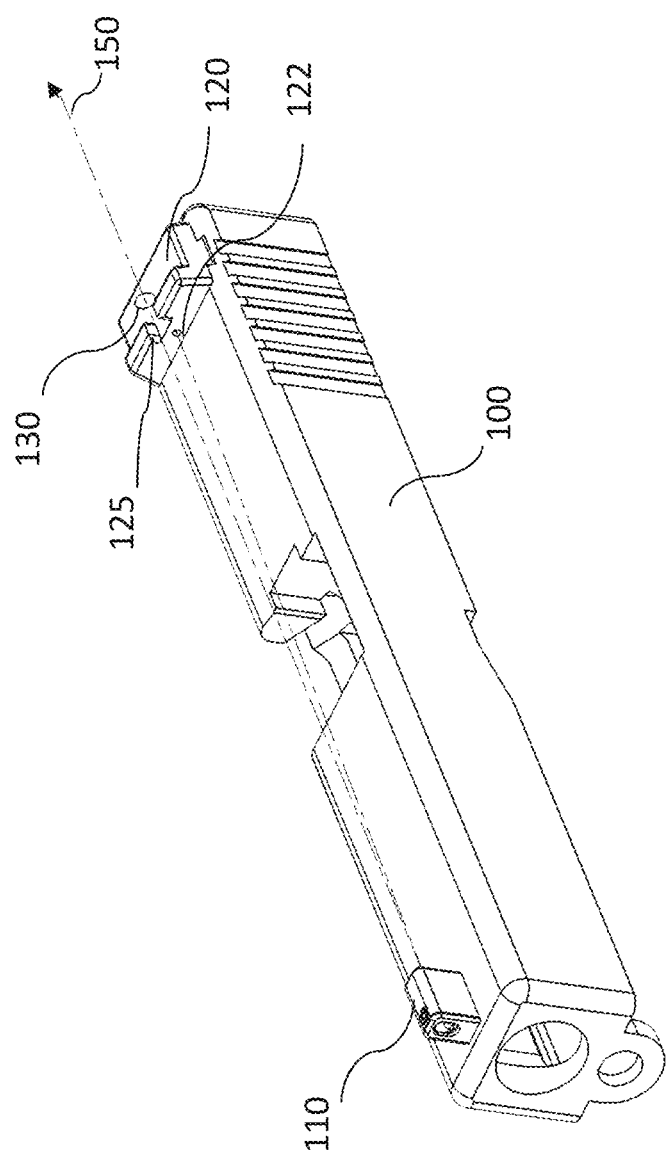
Figure 3:
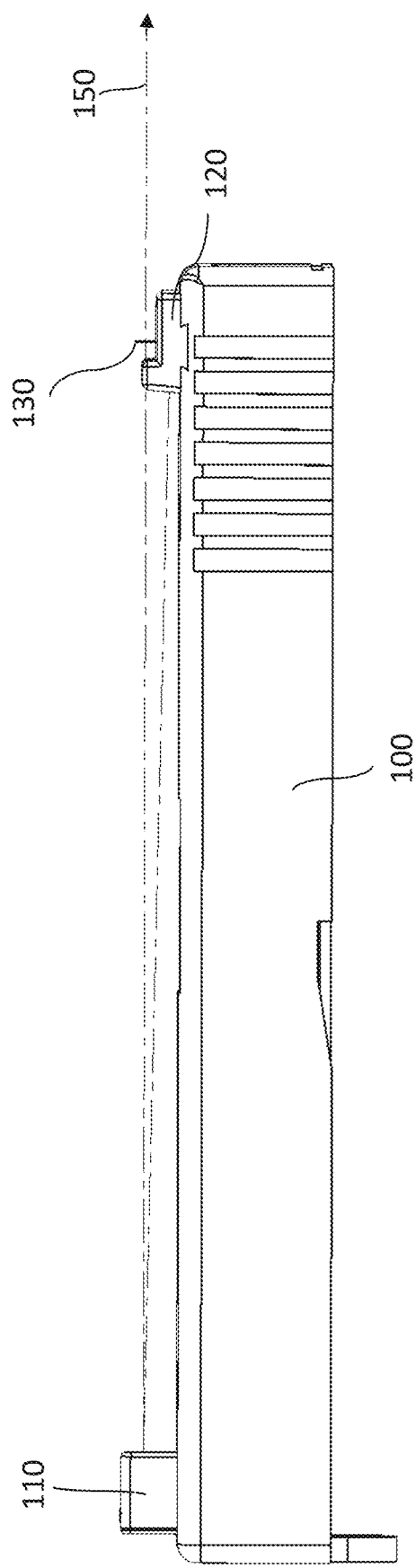
FIG. 3 is a side view of a reflective iron sight in accordance with an exemplary embodiment of the present invention.

FIGS. 1 and 2 illustrate perspective views of a reflective iron sight mounted on a handgun slide according to a preferred embodiment of the present invention. FIG. 3 is a side view of the reflective iron sight and slide shown in FIGS. 1 and 2. As illustrated in FIGS. 1-3, the reflective iron sight includes a front sight 110 mounted in a location adjacent to the muzzle of the barrel, in a front portion of the slide 100, and includes a rear sight 120 mounted in a rear portion of the slide 100, closest to an eye of the user. Although illustrated on a handgun slide throughout the drawings, the reflective iron sights of exemplary embodiments of the present invention can be mounted and used on any suitable firearm.

As described in more detail below, a light source is integrated into the rear sight and illuminates a reflective surface of the front sight, which reflects a targeting point or "dot" back to the rear sight and toward the user. The user can then use the reflected light to assist in aligning the rear sight and the front sight to the target.

FIGS. 1-3 include a dashed line that represents a light path 150 of the light source. As shown in FIGS. 1-3, the light exits an opening 122 of the rear sight 120, reflects off the front sight 110, and back toward the rear sight 120. The light path 150 of the reflected light is adjusted such that light travels to an alignment feature on the rear sight, shown as a notch 125. Reflected light in the alignment feature of the rear sight 120 indicates that the front sight 110 and the rear sight 120 are in alignment with a pre-set zeroed target position relative to the firearm. For example, FIGS. 1-3 show that the reflected light path 150 is directed to an alignment notch 125 in the rear sight 120 and travels through a virtual light path aperture 130 that represents a field of view within the notch 125 where a dot of the light source will be visible on the front sight 110 to the user.

Figure 4:
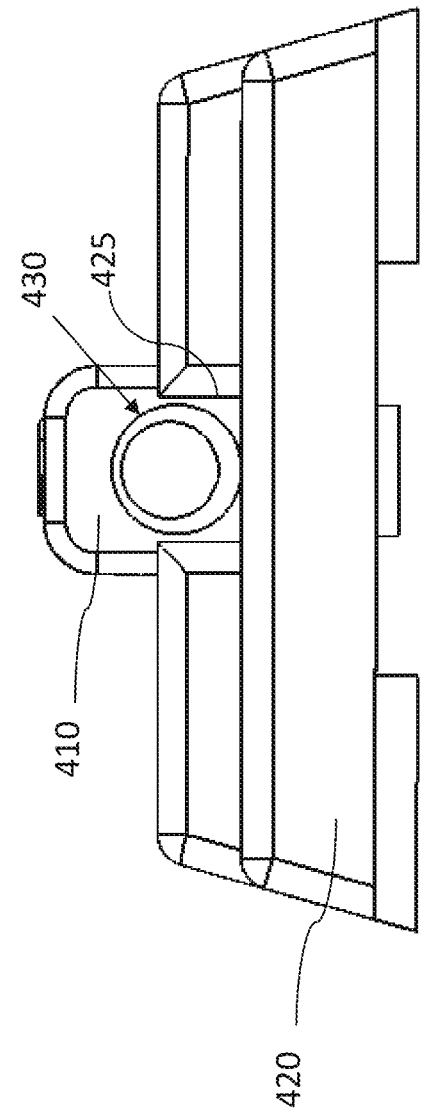
FIG. 4 is a view from a user's perspective of a front sight aligned with a rear sight in accordance with an exemplary embodiment of the present invention.

FIG. 4 is a view from a user's perspective of the front sight 410 aligned with the rear sight 420 where the light path aperture 430 is located within the U-shaped notch 425 of the rear sight 420. In this alignment, light reflected from the front sight 410 will pass though the notch 425, and the reflective iron sight will be aligned to the zeroed target position.

Figure 5:
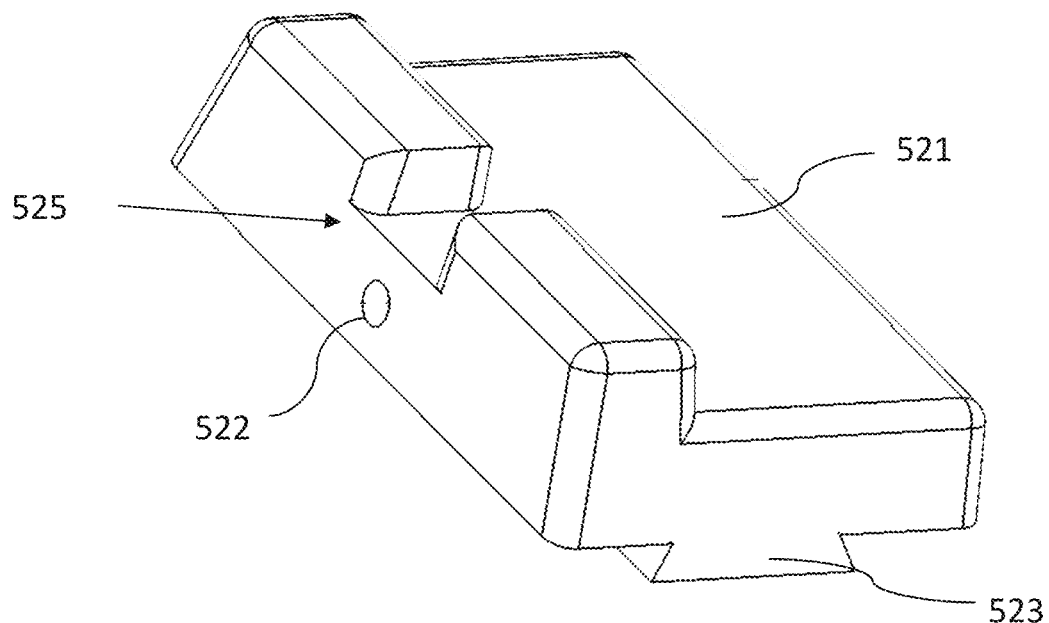
FIGS. 5 and 6 are perspective views of a rear sight in accordance with an exemplary embodiment of the present invention.
Figure 6:
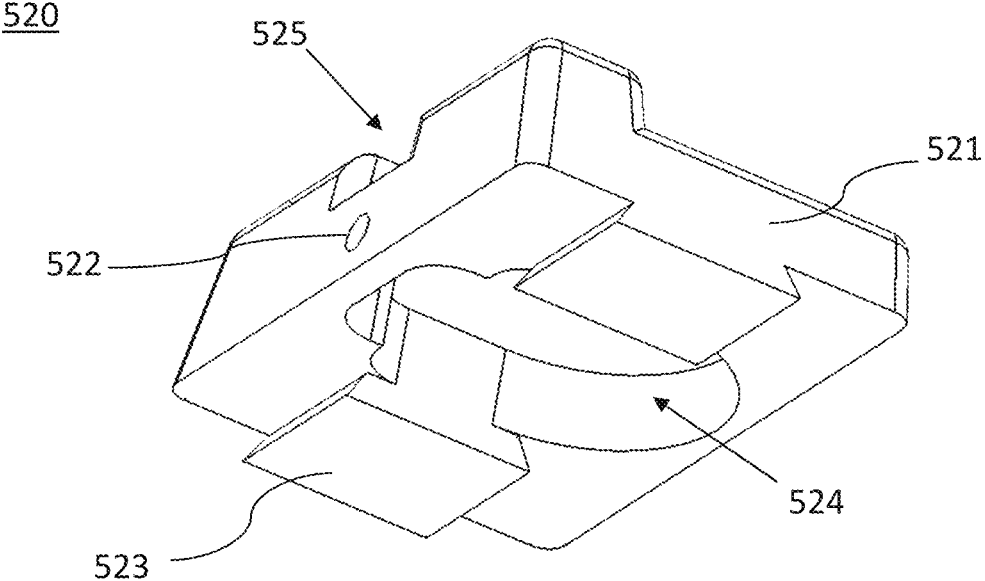

FIGS. 5 and 6 are perspective views of the rear sight 520. As shown in FIGS. 5 and 6, the rear sight 520 can include a housing 521 used to house the light source, an optic, a battery to power the light source, and an on-off switch. As shown, the housing 521 can include a light source aperture or opening 522 in which the light from the light source exits toward the front sight, the notch 525 used to align the rear sight to the front sight, a dovetail 523 to mount the rear sight to the firearm, and a compartment 524 to house the light source and the battery. The housing 521 can also include an optic, lens, window, light pipe, filter, or combinations thereof. The rear sight 520 can be made from metal, plastic, ceramic, composite, or any suitable material.

The light source aperture 522 is an opening or slot to allow light emitted from a light source, such as a light emitting device (e.g., diode or laser), to illuminate a reflective surface of the front sight. The light source can be mounted in the compartment 524 in the bottom of the rear sight 520, and the compartment 524 is preferably sealed to environmentally protect the light source. The light source aperture 522 can be configured to mount and retain a lens, protective window, optical filter, light pipe, and the like, or a combination thereof. A lens can be used to focus or otherwise alter the path of emitted light. A clear window can be used to protect and seal the light source aperture 522. A filter can be used to change the color of the emitted light, reduce the infra-red signature, or enable compatibility with a night-vision imaging system (NVIS) (e.g., night-vision goggles) worn by a user. A light pipe may channel light from the light source to a lens.

The battery can be any size or power that is suitable to power the light source and fit within the available volume of the compartment 524. The battery can be located in the compartment 524 inside the housing 521 or located elsewhere on the firearm. The light source power and/or control wiring can be routed from the battery to the light source.

As shown in FIGS. 5 and 6, the rear sight 520 can include a dovetail 523 to mount the rear sight 520 to the firearm, but alternate mechanisms can be used. For example, alternate mechanisms to mount the rear sight 520 can include fastening, bonding, or welding. Optionally, the rear sight 520 can be integrally formed with a component of the firearm such as a barrel, slide, frame, stock, rail, or the like. As such, the rear sight 520 can include other mounting features to allow the rear sight 520 to be secured to the firearm. The mechanical interface features may vary based on the individual firearm and mounting location and may include, but are not limited to, bosses, recesses, slots, steps, flanges, taps, and the like. Further, the rear sight 520 can be mounted to a firearm via a separate interface or adapter plate.

As shown, the alignment feature on the rear sight 520 is a notch 525 or groove, but can also be a post, blade, bead, ring, or other suitable configuration. The rear sight 520 can be fixed or adjustable with respect to the firearm. Boresight adjustment of the rear sight 520 can be made by moving the rear sight 520 left-to-right in a corresponding dovetail slot in the firearm by force. Optionally, boresight adjustments can be performed by adjusting screws to orient the rear sight 520 with respect to the firearm. For example, boresight adjustment screws can be included and accessed via screw holes. Screws can adjust azimuth and elevation directions. The rear sight 520 can also include night-sight aids such as illumination, tritium, fluorescence, or other glow-in-the-dark material for use in darker ambient conditions.

Figure 7:
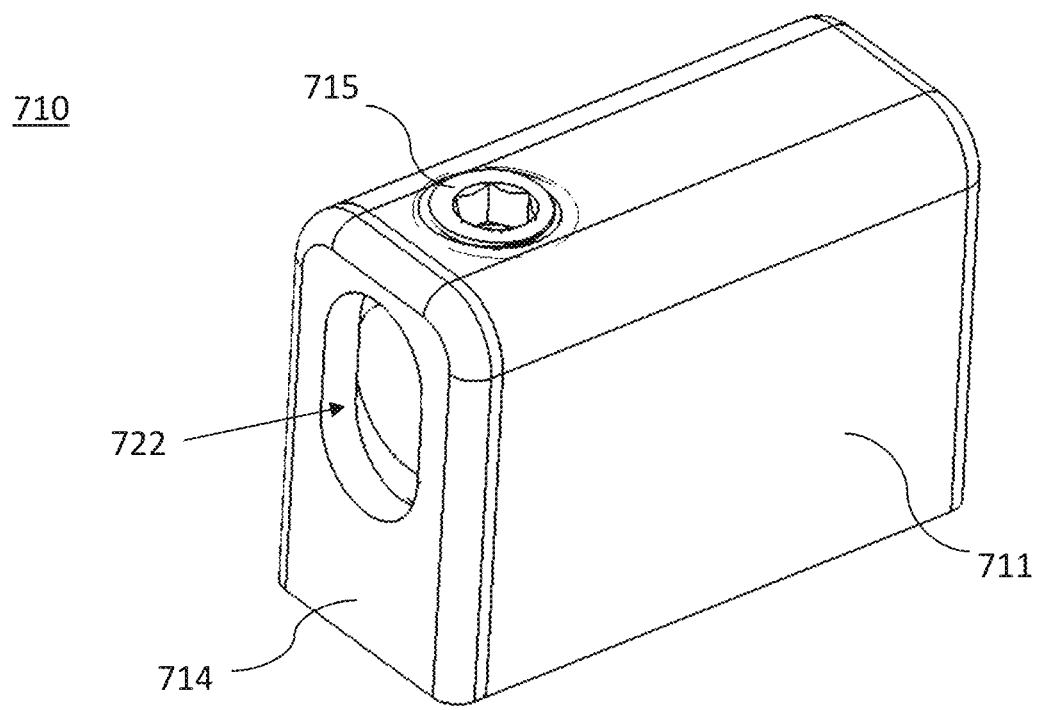
FIGS. 7 and 8 are perspective views of a front sight in accordance with an exemplary embodiment of the present invention.
Figure 8:
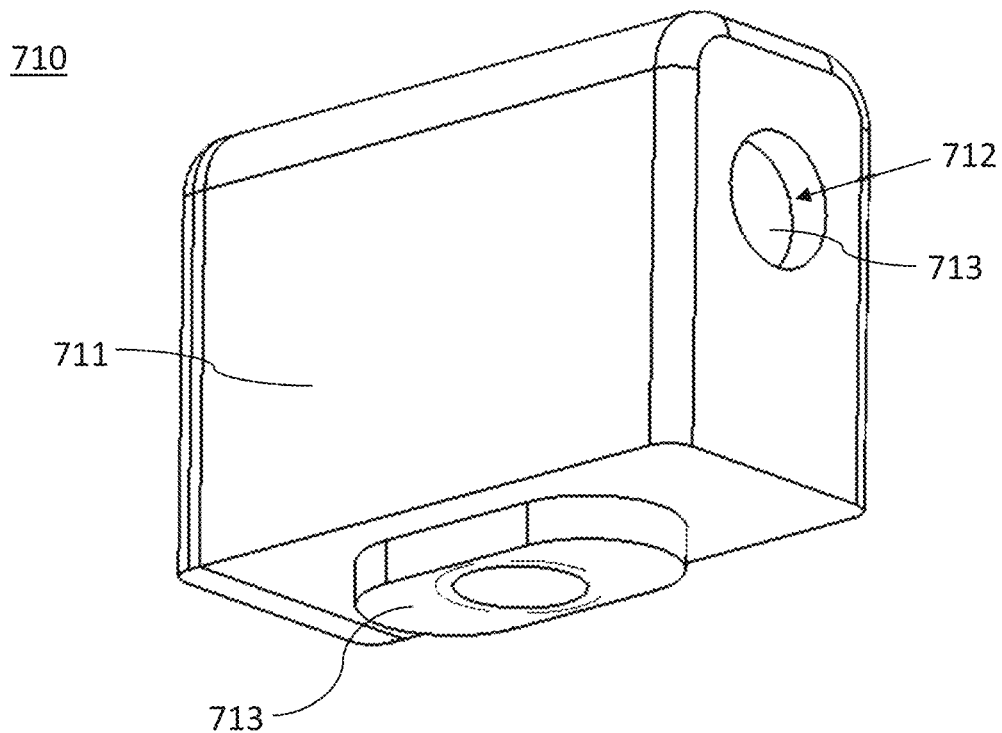

FIGS. 7 and 8 are perspective views of the front sight 710. As shown in FIGS. 7 and 8, the front sight 710 can include a housing 711 used to house a reflector 713, a reflector adjuster 715, a cover 714, and a mount 713. As shown in FIG. 8, the housing 711 includes a reflector aperture 712, an opening in which light from the light source passes through to illuminate a reflective surface on the reflector 713 and is reflected to the rear sight.

The cover 714 allows access to the interior of the housing 711 and preferably environmentally seals the internal components and housing 711. FIG. 7 shows that the cover 714 can optionally include a peep aperture 722 or opening that can be used to aid in targeting alignment such that the front sight 710 can include a sight path entirely through the structure. The peep aperture 722 can be used when the light source is not operating. As shown in FIG. 7, the peep aperture 722 is elliptically shaped, but can be any suitable shape.

As shown in FIGS. 7 and 8, the front sight 710 can include features to directly fasten the front sight to the firearm. FIG. 8 shows that the housing 711 can include a mount 713 that includes a protrusion stepped from the bottom of the housing 711. The mount 713 can be keyed to be securely located within a correspondingly shaped recess on the firearm and include a tapped recess to accept a fastener. The front sight 710 can be directly fastened to a firearm, but alternate mechanisms can be used. For example, alternate mechanisms to mount the front sight 710 can include a dovetail (see FIGS. 9-11), bonding, or welding. Optionally, the front sight 710 can be integrally formed with a component of the firearm such as a barrel, slide, frame, stock, rail, or the like. The mechanical mounting features can vary based on the individual firearm and mounting location and can include, but are not limited to, bosses, recesses, slots, flanges, taps, and the like. Further, the front sight 710 can be mounted to a firearm via a separate interface or adapter plate. The housing 711 and cover 714 of the front sight 710 can be made from metal, plastic, ceramic, composite, or any suitable material.

The reflector adjuster 715 is used to adjust the reflector 713 to align the light path from the light source to the rear sight. FIG. 7 shows that the reflector adjuster 715 is on the top of the front sight 710 and includes a set screw, although other locations and mechanisms of adjustment are possible.

Figure 9:
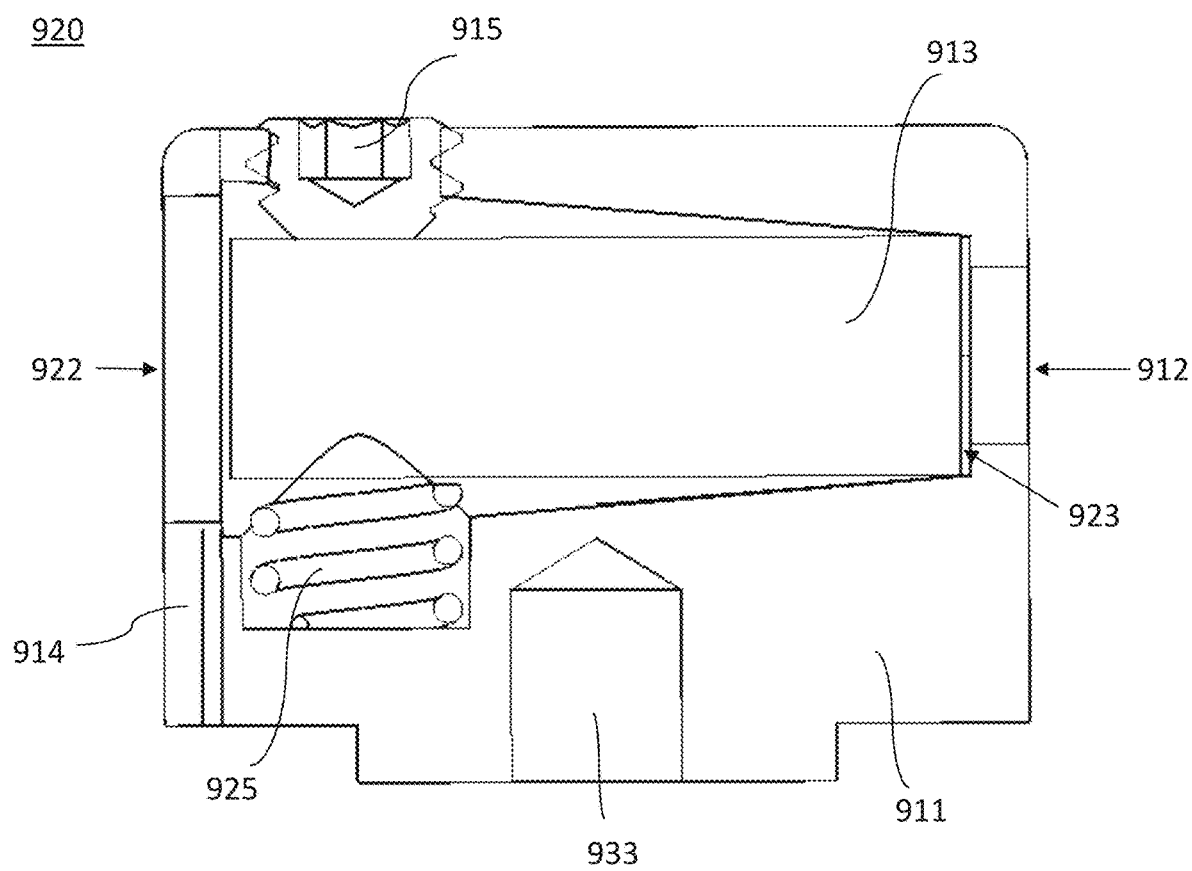
FIG. 9 is a section view of a front sight in accordance with an exemplary embodiment of the present invention.

FIG. 9 is a section view of the front sight shown in FIGS. 7 and 8 that shows the reflector aperture 912, peep aperture 922, cover 914, and reveals internal components of the front sight. FIG. 9 shows that the reflector 913 can be cylindrical and oriented horizontally or substantially horizontal in the housing 911. The reflector 913 includes a reflective or substantially reflective rear surface 923 that reflects light from the light source. The reflector 913 can be a light pipe, lens, or optic that is transparent such that light will pass through from the front to the rear so it can be used as a peep sight, if so configured. Optionally, the reflector 913 can be a mirror or highly reflective surface that can be shaped to focus the reflected light. The reflector 913 can be made of glass, plastic, crystal, metal, or any suitable material.

FIG. 9 also shows the reflector adjuster 915 and a spring 925 that supplies a counter force to the reflector adjuster 915. As shown in FIG. 9, the rear of the reflector 913 is fit into a tight space and retained by interior walls of the housing 911. However, the front portion of the reflector 913 is not constrained by the walls of the housing 911, but held in place between the spring 925 and the reflector adjuster 915. As shown in FIG. 9, the spring 925 forces the front portion of the reflector 913 upward. As mentioned, the reflector adjuster 915 can be a set screw that can be rotated in and out of the housing 911 against the force applied by the spring 925 through the reflector 913. The reflector adjuster 915 is used to rotate the reflective surface 923 of the reflector 913 to vertically align the light path of the light source. Optionally, the front sight can include a similar mechanism in a side of the housing 911 to horizontally further align the light path.

Additionally, FIG. 9 shows a mounting recess 933 in the bottom portion of the housing 911 that may be threaded and used to accept a fastener to mount the front sight to the firearm.

Figure 10:
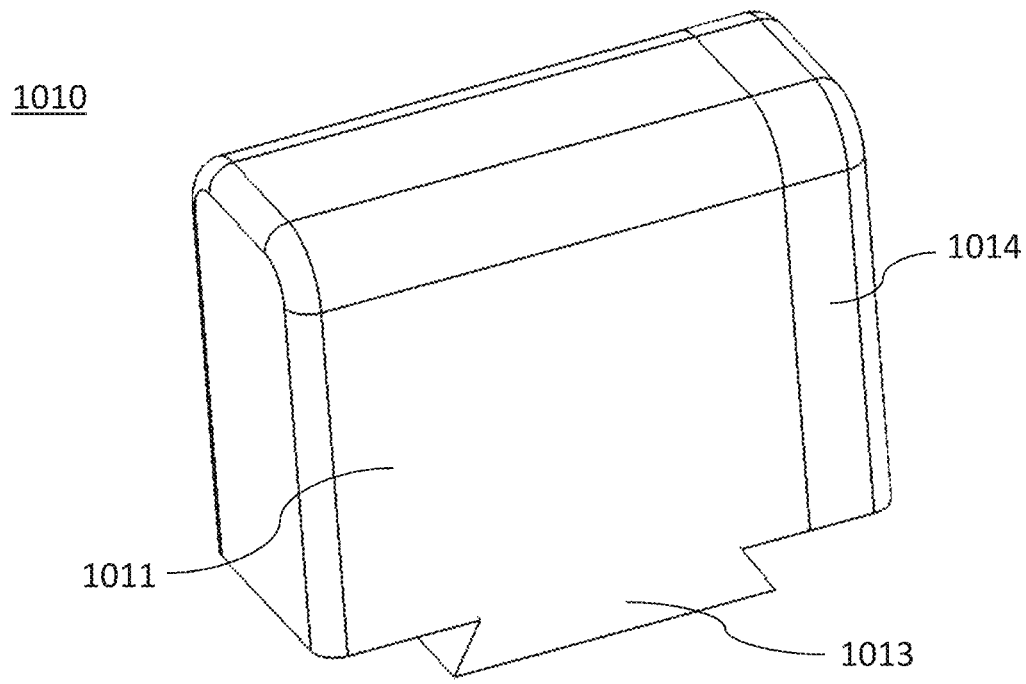
FIGS. 10 and 11 are perspective views of a front sight in accordance with another exemplary embodiment of the present invention.
Figure 11:
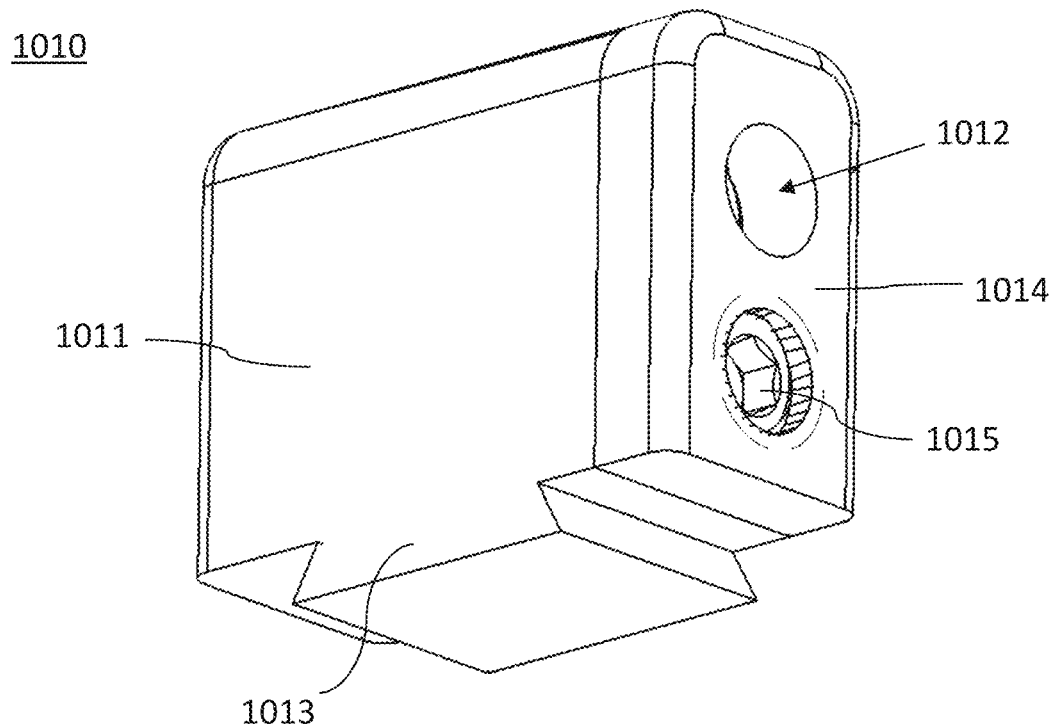

FIGS. 10 and 11 are perspective views of another preferred embodiment of the front sight 1010. FIGS. 10 and 11 show that the cover 1014 is on the opposite side of the housing 1011 as that shown in FIGS. 7 and 8 and includes the reflector adjuster 1015. Also, this preferred embodiment of the front sight 1010 includes a reflector aperture 1012, but does not include a peep aperture. As mentioned above and also shown in FIGS. 10 and 11, the front sight 1010 can include a dovetail 1013 mounting feature similar to that shown with respect to the rear sight.

Figure 12:
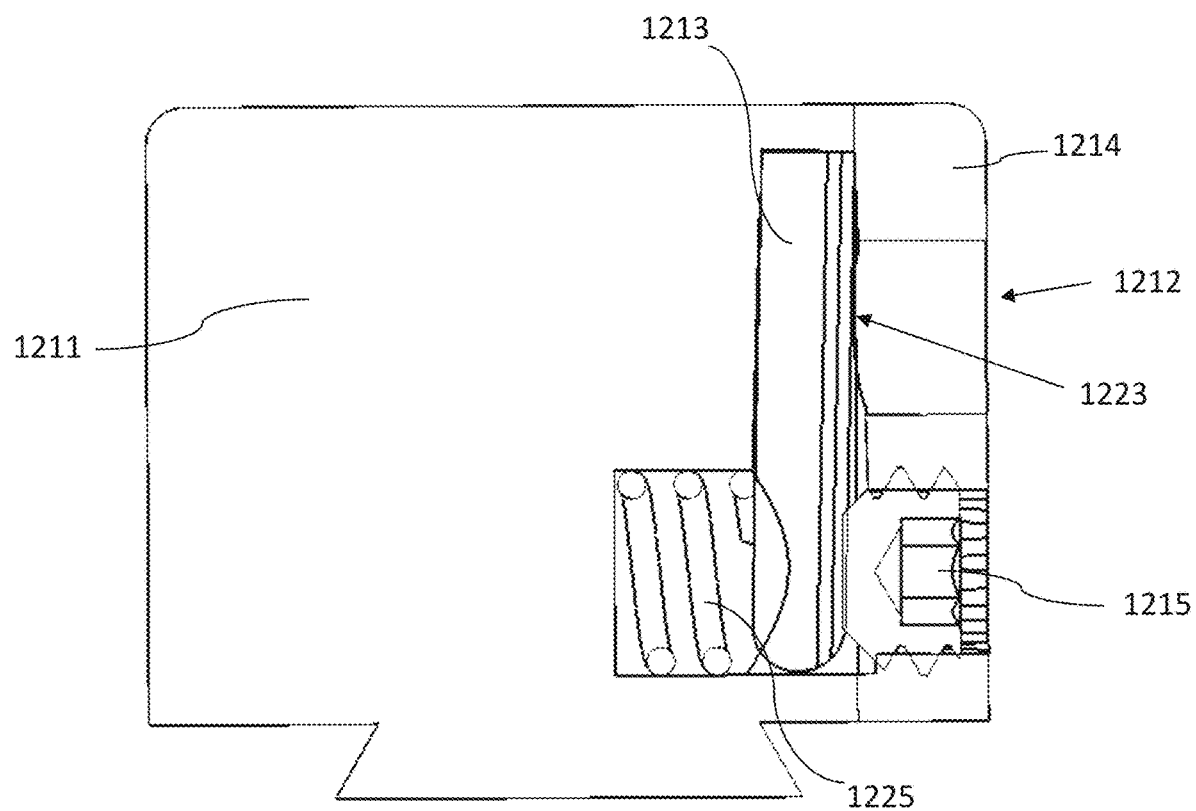
FIG. 12 is a section view of a front sight in accordance with another exemplary embodiment of the present invention.

FIG. 12 is a section view of the front sight shown in FIGS. 10 and 11. Similar to that described with respect to FIG. 9, the spring 1225 supplies a counter force to the reflector adjuster 1215 and the reflector adjuster 1215 within the cover 1214 is used to rotate the reflective surface 1223 of the reflector 1213 to vertically align the light path of the light source through the reflector aperture. As shown, the top portion of the reflector 1213 is fit into a tight space and retained by interior walls of the housing 1211. However, the lower portion of the reflector 1213 is not constrained by the walls of the housing 1211, but held in place between the spring 1225 and the reflector adjuster 1215. As shown, the spring 1225 forces the lower portion of the reflector 1213 rearward and the reflector adjuster 1215 forces the lower portion of the reflector 1213 forward to retain the reflective surface 1223.

Figure 13:
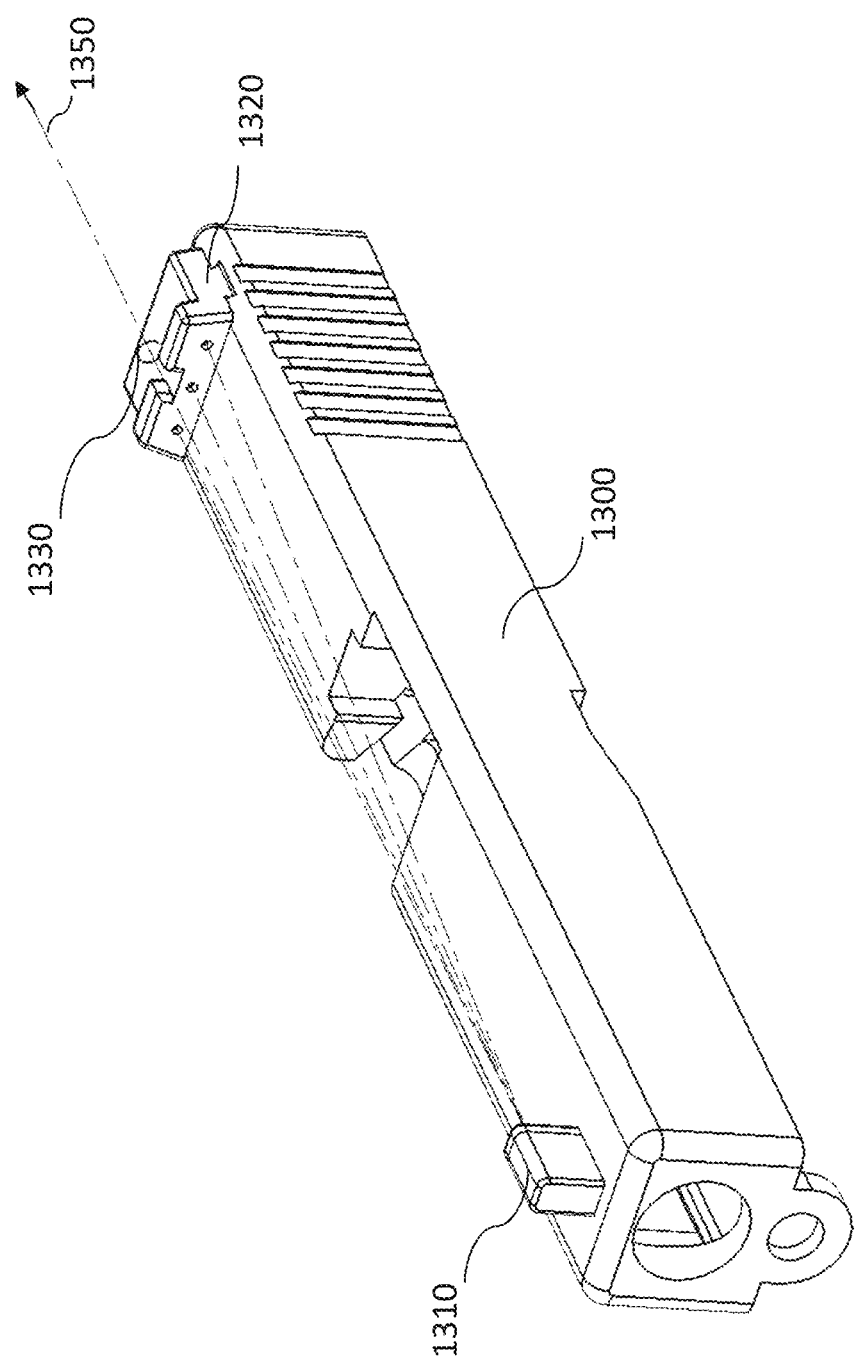
FIG. 13 is a perspective view of a reflective iron sight in accordance with another exemplary embodiment of the present invention.

FIG. 13 is a perspective view of reflective iron sight of another preferred embodiment of the present invention. As shown in FIG. 13, the reflective iron sight is similar to that described above in that the reflective iron sight includes a front sight 1310 mounted in a location adjacent to the muzzle of the barrel, in a front portion of the slide 1300, and includes a rear sight 1320 mounted in a rear portion of the slide 1300, closest to an eye of the user. However, in this embodiment the rear sight 1320 includes a plurality of light sources that are used to emit light that is reflected from the reflector in the front sight 1310. That is, multiple light sources are integrated into the rear sight 1320 and illuminate a reflective surface of the front sight 1310, which reflects a targeting point or "dot" back to the rear sight 1320 along the light path 1350 through the light path aperture 1330 and toward the user. The user can then use the reflected light to assist in aligning the rear sight and the front sight to the target.

Figure 14:
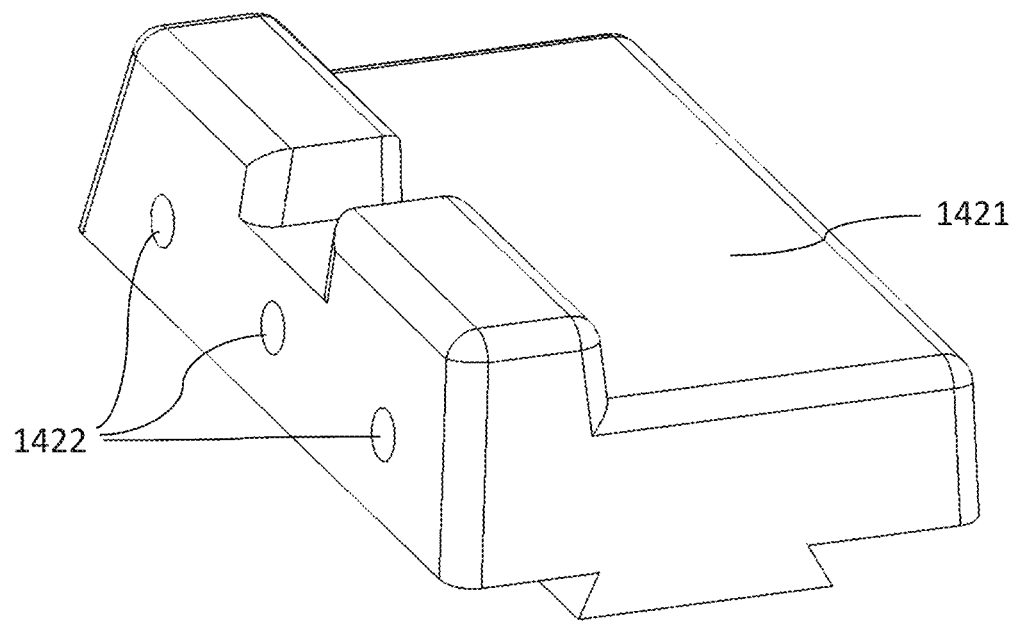
FIG. 14 is a perspective view of a rear sight in accordance with another exemplary embodiment of the present invention.

FIG. 14 shows a housing 1421 of the rear sight shown in FIG. 13 that has three light source apertures 1422, although any number of light source apertures is possible. In operation, three light sources, one each emitted from different light source apertures 1422 can be configured as go/no-go alignment aid with the outer light sources providing a different (out of alignment) color than the center light source to indicate misalignment. That is, if the color of the out-of-alignment light sources is visible through the rear sight 1420, the reflective iron sight is out of targeting alignment. On the other hand, the reflective iron sight is in targeting alignment if the color of the center light source is visible through the rear sight 1420, as described above. Optionally, each of the three light sources can be a different color where the colors of the outer light source indicate which way the reflective iron sight alignment needs to be adjusted towards the center. Optionally, the rear sight can include two light sources, without a center light source, that is used for targeting alignment. A two-light source configuration can provide a larger light path aperture.

As described, all preferred embodiments can be used on any firearm including handguns and longer range firearms.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A gun sight comprising:
   a rear sight including a plurality of light sources with each of at least two light sources of the plurality of light sources emitting a different color of light than the other of the at least two light sources; and
   a front sight including a reflective surface that is directly opposing the plurality of light sources, wherein
   the rear sight and the front sight are configured such that light emitted from the plurality of light sources is reflected by the reflective surface toward the rear sight, and
   the front sight further includes a housing, a reflective surface adjuster inside the housing, and a mount.

2. The gun sight of claim 1, wherein the plurality of light sources is three light sources.

3. The gun sight of claim 2, wherein two of the plurality of light sources emit a same color of light.

4. The gun sight of claim 2, wherein the three light sources each emit a different color of light from each other.

5. The gun sight of claim 1, wherein the rear sight further includes an alignment feature such that light emitted from the plurality of light sources is reflected by the reflective surface through the alignment feature to indicate targeting alignment.

6. The gun sight of claim 5, wherein the alignment feature is a notch.

7. The gun sight of claim 1, wherein the reflective surface is recessed within an aperture of a front sight housing.

8. The reflective sight of claim 1, wherein the front sight further includes an adjuster to adjust the reflective surface.

9. The gun sight of claim 1, wherein the front sight further includes a peep aperture to allow light to pass through the entire front sight.

10. The gun sight of claim 1, wherein the rear sight further includes a housing, an optic, and a power source to power the plurality of light sources.

11. The gun sight of claim 1, wherein the reflective surface is included in an optic that allows light to pass through.

12. A firearm including the gun sight of claim 1.

13. A gun sight comprising:
- a rear sight including a plurality of light sources with each of at least two light sources of the plurality of light sources emitting a different color of light than the other of the at least two light sources; and
- a front sight including a reflective surface that is directly opposing the plurality of light sources, wherein
- the rear sight and the front sight are configured such that light emitted from the plurality of light sources is reflected by the reflective surface toward the rear sight, and
- the rear sight further includes a housing, an optic, and a power source to power the plurality of light sources.

\* \* \* \* \*